US006964989B1

(12) United States Patent
Fang et al.

(10) Patent No.: US 6,964,989 B1
(45) Date of Patent: Nov. 15, 2005

(54) PEELABLE COATING COMPOSITION

(75) Inventors: Jiafu Fang, Spring, TX (US); Zhiqiang Zhang, Lexington, KY (US); Frances E. Lockwood, Georgetown, KY (US); Richard J. Baumgart, Paris, KY (US); Michael A. Dituro, Huntington, WV (US)

(73) Assignee: Ashland Inc., Lexington, KY (US)

( * ) Notice: Subject to any disclaimer, the term of this patent is extended or adjusted under 35 U.S.C. 154(b) by 68 days.

(21) Appl. No.: 10/400,861

(22) Filed: Mar. 27, 2003

Related U.S. Application Data

(63) Continuation-in-part of application No. 09/349,543, filed on Jul. 8, 1999, now abandoned.

(60) Provisional application No. 60/092,079, filed on Jul. 8, 1998.

(51) Int. Cl.[7] ...................... C08K 5/521; C08K 5/053; C08K 5/05

(52) U.S. Cl. ...................... 524/145; 524/140; 524/377; 524/385; 524/386; 524/507; 524/508; 524/512; 524/523

(58) Field of Search ............................... 524/507–508, 524/512, 523, 140, 145, 377, 385–386

(56) References Cited

U.S. PATENT DOCUMENTS

| | | | |
|---|---|---|---|
| 3,207,716 A | 9/1965 | Lippoldt | |
| 4,064,092 A | 12/1977 | Burroway et al. | |
| 4,071,639 A | 1/1978 | Palmer et al. | |
| 4,146,511 A | 3/1979 | Moriya et al. | |
| 4,253,580 A | 3/1981 | Doi et al. | |
| 4,526,913 A * | 7/1985 | Winkler et al. | 524/31 |
| 4,692,494 A | 9/1987 | Sonenstein | |
| 4,886,704 A | 12/1989 | Kamada et al. | |
| 5,030,290 A | 7/1991 | Davis | |
| 5,081,174 A | 1/1992 | VanBuskirk | |
| 5,143,949 A | 9/1992 | Gorgan et al. | |
| 5,194,483 A | 3/1993 | Kawabata | |
| 5,428,095 A | 6/1995 | Swidler | |
| 5,514,441 A | 5/1996 | Pohto et al. | |
| 5,604,282 A | 2/1997 | Gorgan et al. | |
| 5,631,042 A | 5/1997 | Becker et al. | |
| 5,643,676 A | 7/1997 | Dobashi et al. | |
| 5,716,667 A | 2/1998 | Kashiwada et al. | |
| 5,719,221 A | 2/1998 | Swidler | |
| 5,747,572 A | 5/1998 | Kashiwada et al. | |

FOREIGN PATENT DOCUMENTS

| | | |
|---|---|---|
| JP | 05-171069 A | 7/1993 |
| JP | 171069 | 7/1993 |

OTHER PUBLICATIONS

PCT/US98/17681 WO 99/10414 by Maxwell et. al., for "Water Washable Protective Coatings" published on Mar. 4, 1999.

* cited by examiner

*Primary Examiner*—Peter Szekely
(74) *Attorney, Agent, or Firm*—Carrithers Law Office PLLC; David W. Carrithers

(57) ABSTRACT

This invention relates generally to water resistant peelable protective and decorative clear or pigmented coating compositions and, more specifically, to solvent and aqueous based, polymeric coating compositions which form a protective and/or decorative coating on a variety of substrates, including automotive paints, metals, plastics, concrete, natural and synthetic elastomers, and ceramics. The coatings are be formulated for temporary or long term protection depending upon the application.

12 Claims, No Drawings

PEELABLE COATING COMPOSITION

This application claims priority from and is a continuation in part of U.S. Utility application Ser. No. 09/349,543 filed on Jul. 8, 1999 now abandoned, and Provisional Application Ser. No. 60/092,079 filed on Jul. 8, 1998 both of which are incorporated by reference herein.

BACKGROUND OF THE INVENTION

1. Technical Field

This invention relates generally to water resistant peelable protective coating compositions, and, more specifically, to water and solvent based, polymeric coating compositions which form a protective and/or decorative coating on a variety of substrates, including automotive paints, metals, plastics, glass, cloth, paper, asphalt, concrete, porcelain, and ceramics. The coating may be formulated for temporary or long term protection.

2. Description of the Prior Art

A demand exists for a coating composition suitable for the temporary protection of the surface of an article through the depositing on the surface of a coating which can be subsequently be easily removed from the surface without altering the surface.

For example, in the case of painted or polished metal manufactured articles such as automobiles, a need exists for such a coating composition to protect the automobile against weathering, contamination from the atmosphere, chemical attack or accidental damage during handling. Moreover, often the paint on the front end of a motor vehicle or around the outer edges of the fenders is chipped or otherwise damaged by rocks or other small hard objects flying from the road. The paint also becomes unpleasantly dirty after driving the vehicle during warm weather due to insects colliding with portions of the auto body or even due to bird droppings. If dead bugs and bird droppings are left to remain on the paint for a prolonged period of time, permanent stain marks may appear even after cleaning of the automotive body surface. The vehicle's body surface may also be scratched by pets, during delivery from the dealership, or even during transportation and storage from shipping.

A need also exists in the construction area for a temporary, peelable coating which is easily applied and removed to items such as windows and doors.

There is also a need for a peelable protective coating which can applied to a painted surface, or coated surface such as chrome or chrome plated plastic, to prevent damage to the paint.

SUMMARY OF THE INVENTION

This invention relates generally to water resistant peelable protective and decorative clear, translucent, reflective, phosphorescent, or pigmented coating composition and, more specifically, to water and solvent based, polymeric coating compositions which form a protective and/or decorative coating on a variety of substrates, including automotive paints, metals, plastics, glass, cloth, paper, asphalt, concrete, porcelain, and ceramics. The coating may be formulated for temporary or long term protection. The invention also relates generally to water based and solvent based coating composition and their method of application by brush, roll, squeeze tube, crayon, marker, ink pen, foam, jell, paste, spraying, dipping, and as an aerosol.

The present invention provides a decorative, scratch resistant means for protecting the paint, glass, plastic, or metal portions of automotive vehicles during storage and shipping, and against road hazards, debris, bugs, etc. depending upon the particular embodiment selected imparting a tough resistant film characteristic or more elastic characteristic. The peelable coating may also be formulated to be excellent insulating material against scratch or damage to individual parts and may used as packaging material to spray or paint particular parts, such as automotive parts or military equipment prior to shipping.

The present invention provides a protective peelable coating which can be applied to a painted or coated surface of a motor vehicle such as an automobile, airplane, boat, snowmobile, motorcycle, or other vehicle forming a removable coating which can be peeled away leaving a fresh paint surface. The present invention may also be utilized as a removable protective coating for transporting and storing tools and equipment and applied to the bottom surface of snow and water skis, surf boards, snow boards, and other sporting accessories which require a smooth slick surface for optimum performance. A clear and colorless, tinted, or pigmented coating may be applied to the goods to be protected depending upon the application. Moreover, logos, writing and other designs may be imprinted on the coatings and removed by peeling the coating from the goods. It is also contemplated that multiple layer of coatings may be applied providing means to decorate an object.

Accordingly, it is an object of the present invention to provide a clear, translucent, pigmented, dyed, tinted, or illuminative coating for application to a metal, plastic, glass, cloth paper, film, or wood surface.

It is an object of the present invention to provide a peelable in which metal flake, powder, or other decorative particles can be embedded throughout.

It is an object of the present invention to provide a peelable coating which can be removably placed upon a solid substrate such as paints, metals, plastics, concrete, natural and synthetic elastomers, and ceramics and used as a means of removably supporting another substrate such as a metal foil, a plastic film, STYROFOAM, foam product, paper, or one or more additional layers of peelable coating forming a sandwich therewith.

It is an object of the present invention to provide a solvent based or water based peelable coating for use on metal, plastic, glass, paper, or wood surfaces having existing protective coatings of paint, varnish, film, without damaging the existing protective coatings.

It is another object of the present invention to produce a peelable coating which does not damage the surface.

It is another object of the present invention to produce a coating which is easily to apply as a liquid, foam, jell, paste, semi-solid, or aerosol.

It is yet another object of the present invention to produce a protective coating which will not damage paint, chrome, plastic, fiberglass, or other substrate to be coated therewith.

The foregoing objects are accomplished by providing a peelable coating composition comprising a film former, a plasticizer, and a carrier or solvent. The film former is water or solvent based polymeric resin, or mixture of polymeric resins, which form a film after curing or drying. The peelable coating is fast drying due to the evaporation of the solvent carrier and does not depend upon cross-linking of the resin polymer(s) or application of radiation to cure. The resin in the preferred embodiment is a Polyvinyl butyral or a mixture of Polyvinyl butyral having a molecular weight in a range from about 5000 to 500,000. A binder resin such as an aliphatic polyurethane provides flexibility to the product, and a carrier such as water or alcohol may be used in combination with the resin to form a polyurethane dispersion.

Preferred compositions of a clear peelable coating typically contain a Polyvinyl butyral resin in an amount ranging from about 5 percent to about 30 percent by weight of the total weight percent of the composition; a binder resin such as an aliphatic polyurethane in an amount ranging from about 1 percent to about 5 percent by weight of the total weight percent of the composition; a solvent such as an alcohol or water as a carrier in an amount ranging from about 40 percent to 90 percent by weight of the total weight percent of the composition; and a release agent such as a polyvinyl alcohol (PVA) resin or a polyglycol in an amount ranging from about one to 10 percent by weight of the total weight percent of the composition.

The resulting peelable coating exhibits excellent hardness, gloss, flexibility, abrasion resistance, and adhesion. It is resistant to impact, weathering, acids, and alkalies. It is a coating which is impervious to water. It is soluble in aromatic and chlorinated solvents. It may be applied by brush, spray, or dipping.

DESCRIPTION OF THE PREFERRED EMBODIMENT

One embodiment of the peelable coating composition comprises a resin film former, a carrier or solvent, and a binder resin. Another embodiment of the peelable coating composition comprises a resin film former, a solvent, a binder resin, and a release agent. Another embodiment of the peelable coating composition comprises a resin film former, a binder resin, a solvent, a plasticizer and a release agent. Optionally a thickening agent and a pigment may be incorporated within the peelable coating composition. Dyes, pigments, and bactericides are options which may be incorporated into the peelable coatings.

The film former is polymeric resin, or a mixture of polymeric resins, which form a film after curing or drying. The resin in the preferred embodiments is selected from the group including a Polyvinyl butyral, polyvinyl alcohol, polyvinyl acetate, polyurethane, styrene-butadiene copolymers, vinyl toluene-butadiene copolymers, vinyl toluene-acrylate copolymers, styrene acrylate copolymers, or mixtures thereof. Other resins such as amino-formaldehyde resins or polyisocyanate resins may be used alone or in combination therewith. One preferred embodiment uses Polyvinyl butyral having a molecular weight in a low range of about 5000 to a high range of about 500,000, more preferably in a range of from between about 30,000 to about 300,000 and most preferably between about 40,000 and about 200,000. Polyvinyl butyral provides a tough film for use in the peelable coating. The resin selected is preferably UV resistant and may have a stabilizer incorporated therein. The resins may vary in molecular weight and viscosity depending upon the characteristics desired in the resulting peelable coating. An important characteristic of these thermoplastic resins is that they be soluble in water or in solvents because they dry by solvent evaporation. Thus, their dry time is a function of solvent volatility rather than oxidation or polymerization. Preferred compositions of a peelable coating typically contain a resin in an amount up to 60 percent by weight and more preferably ranging from about 1 percent to about 50 percent by weight, more preferably from about 5 percent to about 30 percent by weight, and most preferably about 20 percent by weight of the total weight percent of the composition.

A plasticizer is used to impart flexibility to the peelable coating an impart special physical characteristics to the selected resin such as to facilitate processing and to increase the flexibility and toughness of the final product by internal modification (solvation) of the polymer molecule. Numerous plasticizers are available for utilization in the present invention and may be selected from the group including phthalate, adipates, sebacate esters, and more particularly: glyceryl tri(acetoxystearate), epoxidized soybean oil, epoxidized linseed oil, n-butyl benzene sulfoamide, epoxidized soya oil, polyester glutarate, triethylene glycol caprate/caprylate, long chain alkyl ether, dialkyl diether glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12-PEG-65 lanolin oil, dialkyl adipate, alkylaryl phosphate, alkyl diaryl phosphate, modified triaryl phosphate, triaryl phosphate, butyl benzyl phthalate, octyl benzyl phthalate, alkyl benzyl phthalate, dibutoxy ethoxy ethyl adipate, 2-ethylhexyldiphenyl phosphate, dibutoxy ethoxy ethyl formal, diisopropyl adipate, diisopropyl sebacate, isodecyl oleate, neopentyl glycol dicaprate, neopenty glycol diotanoate, isohexyl neopentanoate, ethoxylated lanolins, polyoxyethylene cholesterol, propoxylated (2 moles) lanolin alcohols, propoxylated lanoline alchols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and Di-isononyl phthalate, (DINP), all of which are soluble in a solvent carrier.

Plasticizers especially useful with the Polyvinyl butyral resins are differentiated primarily by the molecular weights. One or more plasticizers of different molecular weights may be used in the formula depending upon the desired viscosity of the coating. The amount of plasticizer may range from about 0.1 percent to about 20 percent by weight, more preferably from about 0.5 percent to about 10.0 percent by weight, and more preferably from about 1.0 to about 5.0 percent by weight of the total weight percent of the composition.

A solvent such as aromatic and/or aliphatic solvents, ethyl, methyl, isopropyl, butyl alcohol, water, and combinations thereof provide a carrier for the resin and plasticizer. The amount of ethyl alcohol may range from about 35 percent to about 95 percent by weight, more preferably from about 40 percent to 90 percent by weight, and most preferably from about 50 to about 85 percent by weight of the total weight percent of the composition. The solvent acts to dissolve the resin or resins and disperse any additives. Upon application the solvent acts as a carrier providing a fluid to allow migration of the resin particles and leveling of the peelable coating formed upon evaporation of the solvent during the curing process. The peelable coating is fast drying due to the evaporation of the solvent or carrier and does not depend upon cross-linking of the resin polymer(s) or application of radiation to cure.

Release agents may be utilized in the composition such as polyethylene glycol monostearate, silicon polymers, oleic acid, petrolatum, sodium alkyl benzene, sulfonates, siloxanes, silicones, polyglycols, polyvinyl alcohol resins, paraffin and polymeric waxes, synthetic waxes including low molecular weight polyethylene waxes in an effective amount to achieve the desired adhesion of the peelable coating to the substrate.

Thickeners to control the application properties of the coating composition such as the acrylic polymers (sodium polyacrylate, polyacrylic acid), polysaccharides, fillers such as silicas, cellulose, wood flour, and clays may be utilized with the resins of the preferred composition in an effective amount to provide the desired hardness or color to the peelable coating.

Moreover, the addition of an effective amount of one or more of a water soluble resin and/or filler such as PVA, cellulose, and/or a polyglycol may assist in the application of the peelable composition to a substrate having a residual amount of water in the form of droplets, a film, or moisture absorbed thereon by combining with the preexisting moisture of the substrate and improve the compatibility of the solvents or plasticizers therewith.

Microbiocides, pH control agents, UV stabilizers, and may be incorporated in the composition in an effective amount of from between about 0.01 to about 1.0 percent by weight of the total composition.

EXPERIMENTAL EVALUATION

The following examples are presented to illustrate the claimed invention and are not intended to be otherwise limiting:

| INGREDIENT | PERCENT BY WEIGHT |
|---|---|
| Vinyl toluene acrylate copolymer resin | 27–30 |
| Xylene (aromatic solvent) | 12–15 |
| Heptane (aliphatic solvent) | 38–40 |
| Pigment (red, blue, yellow) | 3–5 |
| Polypropylene Glycol | 5–7 |
| 2-ethylhexyldiphenyl phosphate | 6–9 |
| Wood flour | 0.1–2.0 |

The solvents were mixed together and the resin and pigment(s) were added to the solution at about 120° F. over a period of about two hours. The remaining constituents were added thereafter. An important consideration is the $K_p$ value of the peelable coating composition which measures the aromaticity of the film. If the aromaticity is too high the solvent carrier of the peelable coating will tend to dissolve certain substrates. Thus, the peelable coating must dry quickly before dissolving substrates susceptible to the solvent used as the carrier in a selected composition.

Additional preferred compositions of the above formulation may be formulated to provide peelable coatings having particular characteristics by blending the compounds as follows. Preferred compositions include an effective amount of a resin to form a peelable coating which is soluble in aliphatic and/or aromatic solvents such as a vinyl toluene acrylate copolymer resin in an amount ranging from about 10 to about 50 percent by weight, more preferably from about 20 to 40 percent by weight, and most preferably from about 25 to 35 percent by weight.

An effective amount of an aromatic solvent, aliphatic solvent, or combination thereof to dissolve the resin or resins, wherein the solvent is present in an amount ranging from about 20 to about 90 percent by weight, more preferably from about 40 to 80 percent by weight, and more preferably from about 50 to 75 percent by weight is also included in the composition. Alternatively, an combination of an aliphatic solvent in an effective amount ranging from between 0.01 to about 90 percent by weight, more preferably from about 20 to about 60 percent by weight and most preferably form about 30 to about 50 percent by weight may be utilized together with an effective amount of an aromatic solvent in an amount of between 0.01 to 90 percent by weight, more preferably from about 1 to 50 percent by weight, and most preferably from about 5 to 25 percent by weight. A plasticizer, preferably a phosphate plasticizer is added in an effective amount of from between about 0.1 to about 40.0 percent by weight, more preferably from about 1.0 to 20 percent by weight, and most preferably from about 5.0 to about 15 percent by weight.

A filler such as wood flour may optionally be added to the composition in an effective amount of between about 0.1 and 10 percent, more preferably between about 0.5 and 5.0 percent, and most preferably from between about 1.0 and 2.0 percent by weight.

A polyglycol such as polypropylene glycol may optionally be added to the peelable coating composition in an effective amount of from between about 0.1 and 20 percent by weight, more preferably from between about 1.0 and 10.0 percent by weight, and most preferably of from between about 3.0 and 8.0 percent by weight of the total composition.

The above-composition may be formed as a clear peelable coating composition or tinted with a dye in an effective amount of from between about 0.1 and 5.0 percent by weight. At least one preferred embodiment utilizes a pigment (red, blue, yellow, green, etc.) either organic or inorganic in an effective amount of between 0.1 to 10.0 percent by weight, more preferably from between about 1.0 and 5.0 percent by weight, and most preferably from between about 3.0 to about 5.0 percent by weight.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

What is claimed is:

1. A peelable coating composition for application to the glass, metal, plastic, natural and synthetic elastomers, automotive paint, rubber exterior surface of a vehicle forming a protective and/or decorative peelable coating thereon; comprising:

- a polyvinyl butyral resin in an amount ranging from about 5 percent to about 30 percent by weight of the total weight percent of the composition;
- a binder resin comprising a polyurethane in an amount ranging from about 1 percent to about 5 percent by weight of the total weight percent of the composition;

a carrier comprising a solvent selected from the group consisting of an alcohol, a water, and combinations thereof in an amount ranging from about 40 percent to 90 percent by weight of the total weight percent of the composition;

a release agent comprising a polyvinyl alcohol resin in an amount ranging from about one to 10 percent by weight of the total weight percent of the composition; and wherein said peelable coating is cured by solvent evaporation.

2. A peelable coating composition for application to the glass, metal, plastic, natural and synthetic elastomers, automotive paint, rubber exterior surface of a vehicle forming a protective and/or decorative peelable coating thereon; comprising:

a polyvinyl butyral resin in an amount ranging from about 5 percent to about 30 percent by weight of the total weight percent of the composition;

a binder resin consisting essentially of a polyurethane in an amount ranging from about 1 percent to about 5 percent by weight of the total weight percent of the composition;

a carrier consisting essentially of a solvent selected from the group consisting of an alcohol, a water, and combinations thereof in an amount ranging from about 40 percent to 90 percent by weight of the total weight percent of the composition; and a release agent consisting essentially of a polyvinyl alcohol resin in an amount ranging from about one to 10 percent by weight of the total weight percent of the composition; and wherein said peelable coating is cured by solvent evaporation.

3. A peelable coating composition for application to the glass, metal, plastic, natural and synthetic elastomers, automotive paint, rubber exterior surface of a vehicle forming a protective and/or decorative peelable coating thereon; comprising:

a vinyl toluene acrylate copolymer resin in an amount ranging from 27–30 percent by weight of the total composition;

an aromatic solvent in an amount ranging from 12–15 percent by weight of the total composition;

an aliphatic solvent in an amount ranging from 38–40 percent by weight of the total composition;

a pigment in an amount ranging from 3–5 percent by weight of the total composition;

a plasticizer in an amount ranging from 5–16 percent by weight of the total composition;

a wood flour in an amount ranging from 0.1–2.0 percent by weight of the total composition; and wherein said peelable coating is cured by solvent evaporation.

4. The peelable coating of claim 3, wherein said plasticizer is selected from the group consisting of a glycol, a 2-ethylhexyldiphenyl phosphate, and combinations thereof.

5. The peelable coating of claim 4, wherein said glycol is a polypropylene glycol.

6. The peelable coating of claim 4, wherein said glycol is present in an amount ranging from 5–7 percent by weight of the total weight of the composition.

7. The peelable coating of claim 4, wherein said 2-ethylhexyldiphenyl phosphate is present in an amount ranging from 6–9 percent by weight of the total weight of the composition.

8. The peelable coating of claim 3, wherein said aromatic solvent is xylene.

9. The peelable coating of claim 3, wherein said aliphatic solvent is heptane.

10. A peelable coating composition for application to the glass, metal, plastic, natural and synthetic elastomers, automotive paint, rubber exterior surface of a vehicle forming a protective and/or decorative peelable coating thereon; comprising:

a vinyl toluene acrylate copolymer resin in an amount ranging from 27–30 percent by weight of the total composition;

an aromatic solvent consisting essentially of xylene in an amount ranging from 12–15 percent by weight of the total composition;

an aliphatic solvent consisting essentially of heptane in an amount ranging from 38–40 percent by weight of the total composition;

a plasticizer comprising a glycol in an amount ranging from 5–7 percent by weight of the total composition;

a plasticizer consisting essentially of a 2-ethylhexyldiphenyl phosphate in an amount ranging from 6–9 percent by weight of the total composition;

a wood flour in an amount ranging from 0.1–2.0 percent by weight of the total composition; and wherein said peelable coating is cured by solvent evaporation.

11. The peelable coating of claim 10 further comprising a pigment in an amount ranging from 3–5 percent by weight of the total composition.

12. The peelable coating of claim 10 further comprising a dye in an amount ranging from 0.1 to 5 percent by weight of the total composition.

* * * * *